(12) United States Patent
Stroh et al.

(10) Patent No.: US 6,662,404 B1
(45) Date of Patent: Dec. 16, 2003

(54) HIGH LOAD BEARING CENTRAL-BRAKING CASTER

(75) Inventors: Glenn C. Stroh, Marion, TX (US); Steven A. Berkowitz, San Antonio, TX (US)

(73) Assignee: KCI Licensing, Inc., San Antonio, TX (US)

( * ) Notice: Subject to any disclaimer, the term of this patent is extended or adjusted under 35 U.S.C. 154(b) by 0 days.

(21) Appl. No.: 10/213,054

(22) Filed: Aug. 6, 2002

(51) Int. Cl.$^7$ ................................................ B60B 33/00
(52) U.S. Cl. .......................................... 16/35 R; 16/47
(58) Field of Search ................................ 16/35 R, 35 D, 16/38, 31 R, 31 A, 43, 47; 188/1.12, 29; 5/600, 625, 626, 618, 86.1

(56) References Cited

U.S. PATENT DOCUMENTS

| | | | |
|---|---|---|---|
| 3,911,525 A | | 10/1975 | Haussels |
| 3,914,821 A | | 10/1975 | Screen |
| 3,949,444 A | | 4/1976 | Mattinson |
| 4,414,702 A | | 11/1983 | Neumann |
| 4,550,808 A | | 11/1985 | Folson |
| 4,747,180 A | | 5/1988 | Screen |
| 5,014,391 A | | 5/1991 | Schulte |
| 5,083,341 A | * | 1/1992 | Milbredt et al. ............. 16/35 R |
| 5,368,133 A | * | 11/1994 | Yang ........................ 188/1.12 |
| 5,415,252 A | * | 5/1995 | Estkowski ................ 188/1.12 |
| 5,774,936 A | | 7/1998 | Vetter |
| 5,799,366 A | * | 9/1998 | Zocco et al. ................ 16/35 R |
| 5,988,323 A | * | 11/1999 | Chu ......................... 188/1.12 |
| 6,296,261 B1 | | 10/2001 | deGoma |
| 6,360,851 B1 | * | 3/2002 | Yang ........................ 188/1.12 |

FOREIGN PATENT DOCUMENTS

| | | | |
|---|---|---|---|
| DE | 2643551 B1 | * | 12/1977 |
| DE | 2643297 A1 | * | 3/1978 |
| DE | 3026459 A1 | * | 2/1982 |
| JP | 2-57403 | * | 2/1990 |
| JP | 7-266803 | * | 10/1995 |
| WO | WO 02/20285 A1 | * | 3/2002 |

* cited by examiner

*Primary Examiner*—Chuck Y. Mah
(74) *Attorney, Agent, or Firm*—Eric Cernyar (57) ABSTRACT

A high-load, high-performance, twin-wheeled central-braking caster for a bed is provided having two wheels each comprised of an aluminum core disc and an annular cylindrical flange. The inside of the flanges are covered with elastomeric material in order to serve as brake drums for the wheels. The caster has a central braking mechanism comprising a spring-loaded double-armed brake lever mounted on a pivot pin to guide the brake lever so that it pivots exclusively about a horizontal axis perpendicular to the direction of the wheels' forward rolling movement. The central braking mechanism further comprises a pivot block with an aperture for receiving the pivot pin for mounting the brake lever. The braking mechanism further comprises two compression springs having sufficient spring force to bias the double-armed brake lever away from the wheel. Recesses are provided in the pivot block for anchoring an end of each of the compression springs, the opposite ends of the compression springs being disposed to provide a pushing force against a saddle portion of the double-armed brake lever in order to bias the brake arm away from the brake drum. Flattened teeth are provided on each arm of the brake lever to grab the elastomeric material on the inside surface of the corresponding wheel's annular flange in order to inhibit wheel rotation.

21 Claims, 10 Drawing Sheets

HIGH LOAD BEARING CENTRAL-BRAKING CASTER

FIELD OF THE INVENTION

This invention relates generally to a caster having a central locking device for arresting its wheel.

BACKGROUND

Traditional central locking casters comprise a wheel mounted on a fork, the fork having a sleeve that houses a plunger or push rod, and a mushroom-shaped breaking member mounted on the bottom of the plunger or push rod that engages the perimeter of the wheel in order to lock it. Examples and variations of such casters are disclosed in U.S. Pat. No. 3,911,525 to Haussels; U.S. Pat. No. 4,414,702 to Neumann; and U.S. Pat. No. 5,774,936 to Vetter.

A disadvantage of several traditional central locking casters is their yokes often fail prematurely under heavy loads. For especially heavy loads (such as with bariatric beds), double wheel casters typically perform better under heavy loads and in circumstances where maneuverability is critical. For obvious reasons, traditional central locking mechanisms are not as suitable for double-wheeled casters as they are for single-wheeled casters.

Many alternative braking mechanisms have been designed for casters. U.S. Pat. No. 3,914,821 to Screen, for example, discloses a foot-operated brake linked to a brake shoe that engages an inner surface of the roller. Another patent to the same inventor, U.S. Pat. No. 4,747,180, discloses a braking system for a caster comprising a cam-activated brake rod able to extend all the way to the floor to prevent movement. U.S. Pat. No. 5,014,391 to Schulte discloses a brake lever bearing a sharp-toothed brake member that interacts with a brake rim. U.S. Pat. No. 4,550,808 to Folson discloses a caster having a foot-operated brake lever that acts against a link, which in turn acts against a brake shoe comprising two side arms or flanges that "actually dig into" the inside surface of the outer cylindrical flange of the caster wheel. Darcor®, based in Toronto, Canada, markets a caster wheel designed in particular for bariatric beds that utilizes a push rod that acts upon a spring-loaded brake arm bearing sharp teeth to mate against an inner surface of the roller wheel.

Many problems have been encountered with existing teeth-based brake designs. The teeth can break off prematurely, destroying the caster's braking function. Moreover, the teeth prematurely wear out the braking surface of the wheel. Another problem encountered with one commercially popular brake-arm design is that the brake arm is loosely anchored in a manner that allows it to rock from side to side, instead of pivoting exclusively about a horizontal axis perpendicular to the direction of the wheel's forward rolling movement. The biasing spring force is also poor. Therefore, when the caster wheel is jarred, as occurs when rolling a bed over a bump, the sharp teeth of the brake arm may grab the wheel even when the wheel is not engaged by the push rod, causing the caster to brake when it is not supposed to. Even worse, the brake arm may wedge into the wheel as it continues to turn, causing the caster to permanently lock up.

What is needed is an improved central braking mechanism for a high-load bearing caster.

SUMMARY OF THE INVENTION

The invention is directed to, but not limited by, one or more of the following non-exhaustive objects, separately or in combination:

to pvide a high-load, high-performance caster with a central-locking system suitable for bariatric beds, the caster having two wheels mounted on a axle of a sturdy yoke integrally formed with a semi-cylindrical cap or flange covering the top surface of the gap between the wheels;

to provide a twin-wheeled caster with a spring-loaded double-armed brake lever central locking mechanism;

to provide caster wheels comprised of an aluminum-core disc and an annular cylindrical flange covered with elastomeric material, an inside, elastomeric-covered concave surface of the annular flange serving as a brake drum for the wheel;

to provide a pivot pin to guide the spring-loaded double-armed brake lever so that it pivots exclusively about a horizontal axis perpendicular to the direction of the wheels' forward rolling movement;

to provide a pivot block with an aperture for receiving the pivot pin for mounting the double-armed brake lever;

to provide two compression springs having sufficient spring force to bias the double-armed brake lever away from the wheel;

to provide recesses in the pivot block for anchoring an end of each of the compression springs, the opposite ends of the compression springs being disposed to provide a pushing force against a saddle portion of the double-armed brake lever in order to bias the brake arm away from the brake drum;

to provide an aperture extending vertically through the top and bottom of the pivot block in which to receive a flathead screw to mount the pivot block to the yoke;

to provide teeth on each arm of the brake lever to grab the elastomeric material on the inside surface of the corresponding wheel's annular flange in order to inhibit wheel rotation;

to provide smoother, wider, and flatter teeth than typically used or taught in the caster brake art to minimize wear of the elastomeric material on the wheel's annular flange;

to provide this caster for use on office furniture, computer furniture, and hospital beds, examples of the latter of which are disclosed in U.S. Pat. No. 6,115,860 to Vrzalik; U.S. Pat. No. 5,611,096 to Bartlett, et al.; and U.S. Pat. No. 4,638,519 to Hess; and PCT/US97/21285, filed Nov. 17, 1997, the details of all four of which are herein incorporated by reference; and to provide this caster for use on bariatric products, including beds, chairs, wheelchairs, and walkers.

These and other aspects, objects, features, and advantages of the present invention will be readily apparent to those skilled in the art from the following detailed description taken in conjunction with the annexed sheets of drawings, which illustrate the invention.

DETAILED DESCRIPTION

Based on the description and illustrations provided herein, the many benefits provided by the invented structure and methods of utilization are apparent. These described benefits, as well as those that are inherent to those skilled in the art, fall within the scope of the invention of the present patent application as limited only by the claims appended hereto.

Figure 1:
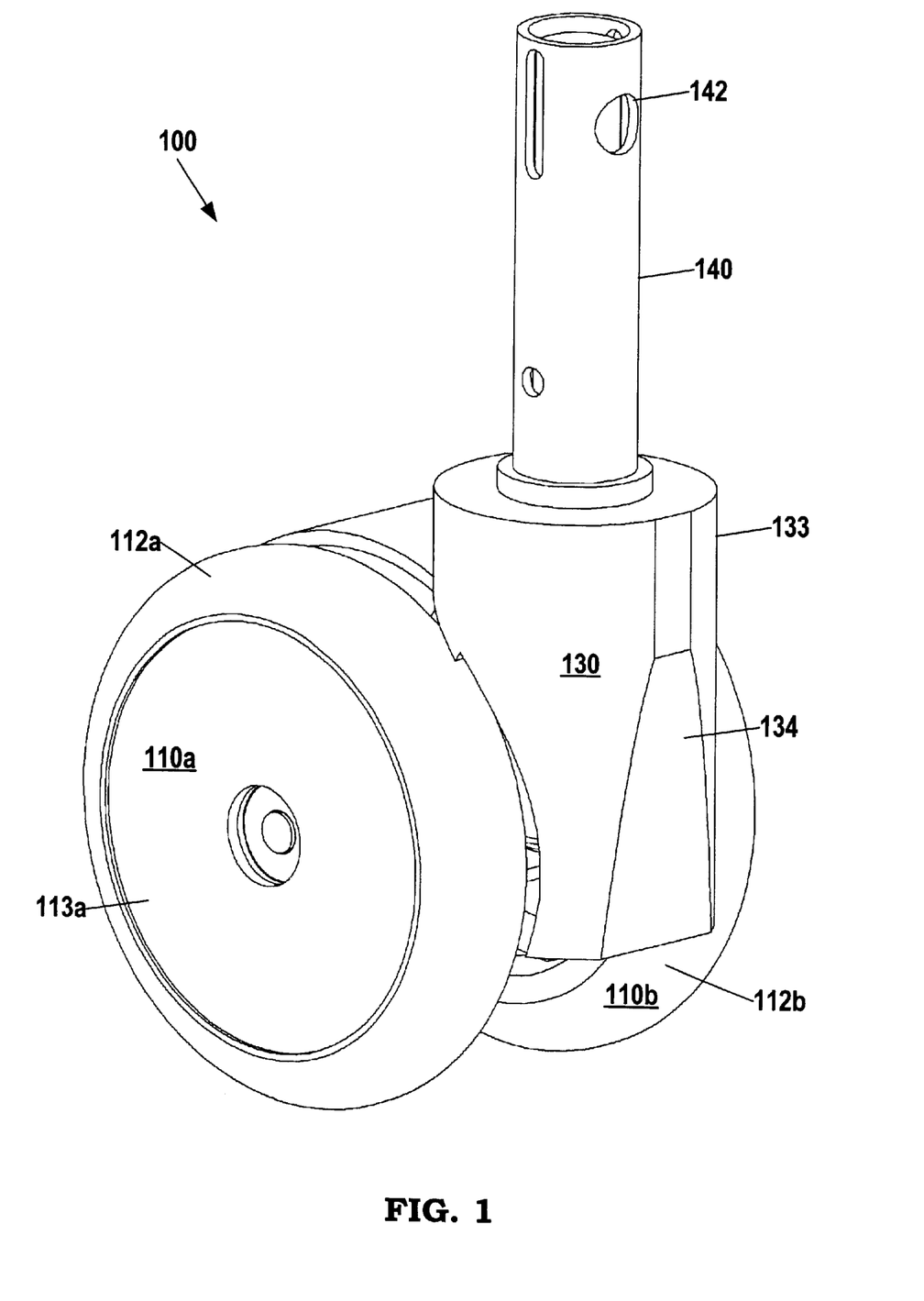
FIG. 1 is an elevated perspective view of a double-wheeled embodiment of a roller in the form of a caster.
Figure 2:
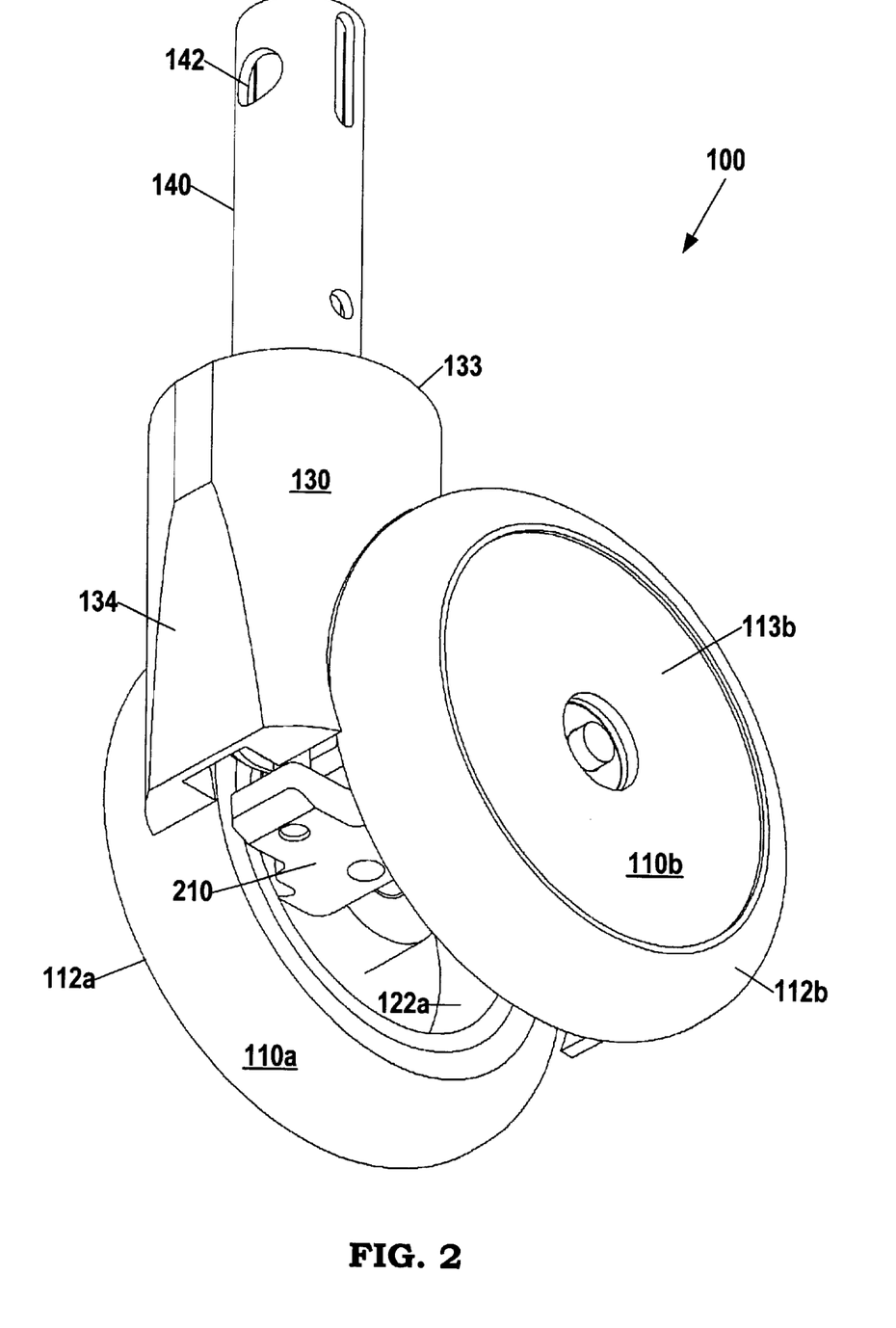
FIG. 2 is another perspective view of the roller of FIG. 1, displaying the underside of the roller.
Figure 3:
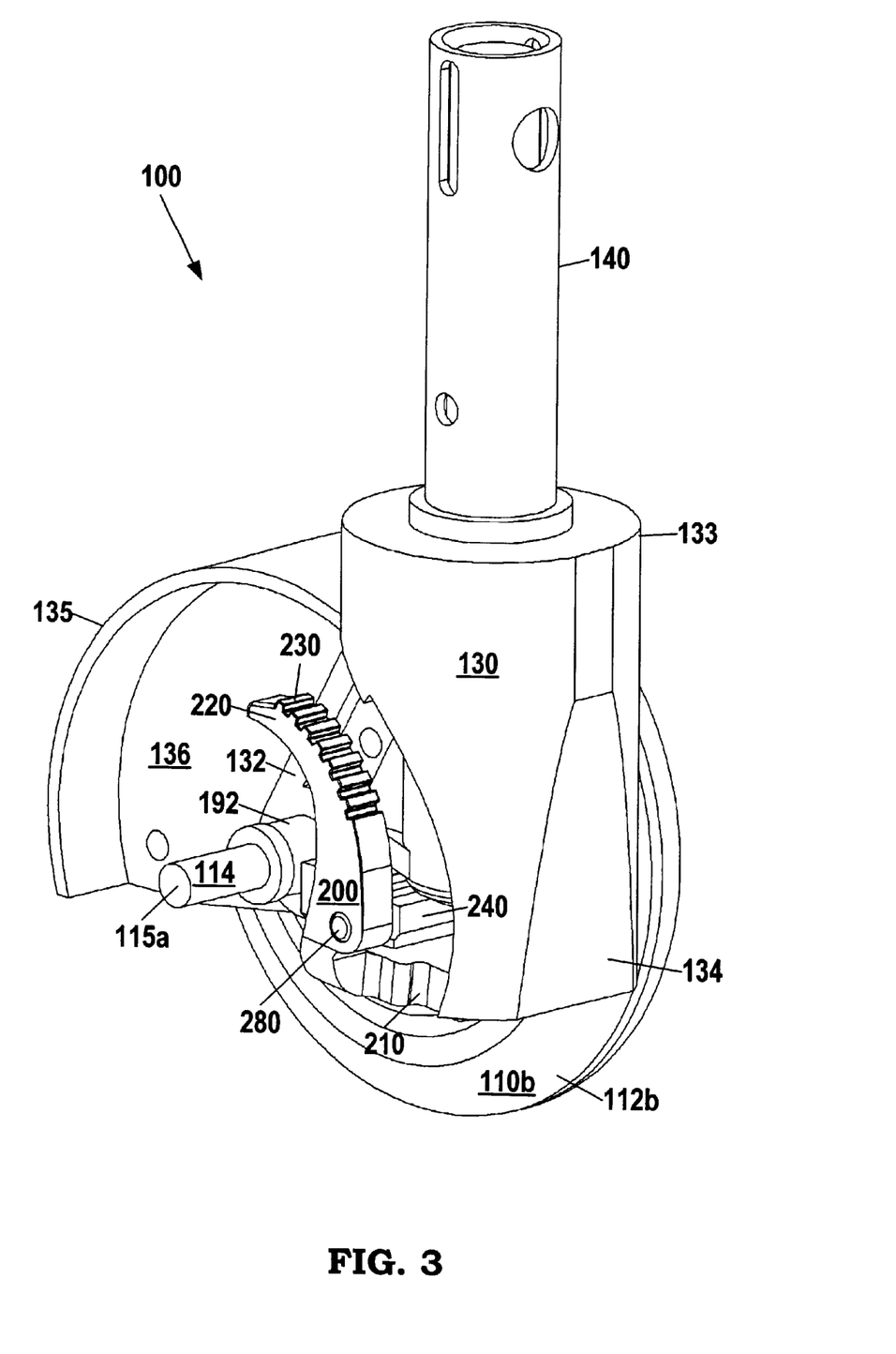
FIG. 3 is an elevated perspective view of the roller of FIG. 1, with one of the wheels removed, exposing a portion of the braking system therein.

One embodiment of a caster 100 of the present invention includes a main caster body or yoke 130. The yoke 130 includes a substantially cylindrical housing 133 strengthened by reinforcing ribs 134. The housing 133 optionally surrounds and hides a swivel mechanism (not shown) of the yoke 130. The yoke 130 also includes one or more reinforcing rib or flange members 132 that transfer load from the apparatus (such as a bariatric hospital bed) supported by the caster 100 to the wheel-bearing axle 114. Flange members 132 extend radially from a central boss portion 192 (FIGS. 3, 6) of the axle 114 to the cylindrical housing 133.

A semi-cylindrical cap or flange 135 extends from and is integral with the yoke 130. The flange 135 surrounds or covers the top portion of the gap between the two wheels 110a, 110b of the caster, protecting the surrounded components from dust, spills, and the like. As illustrated best in FIGS. 3 and 6, a semicircular disc 136 extending radially from the boss portion 192 of the axle 114 to the flange 135 further reinforces the flange 135.

Figure 4:
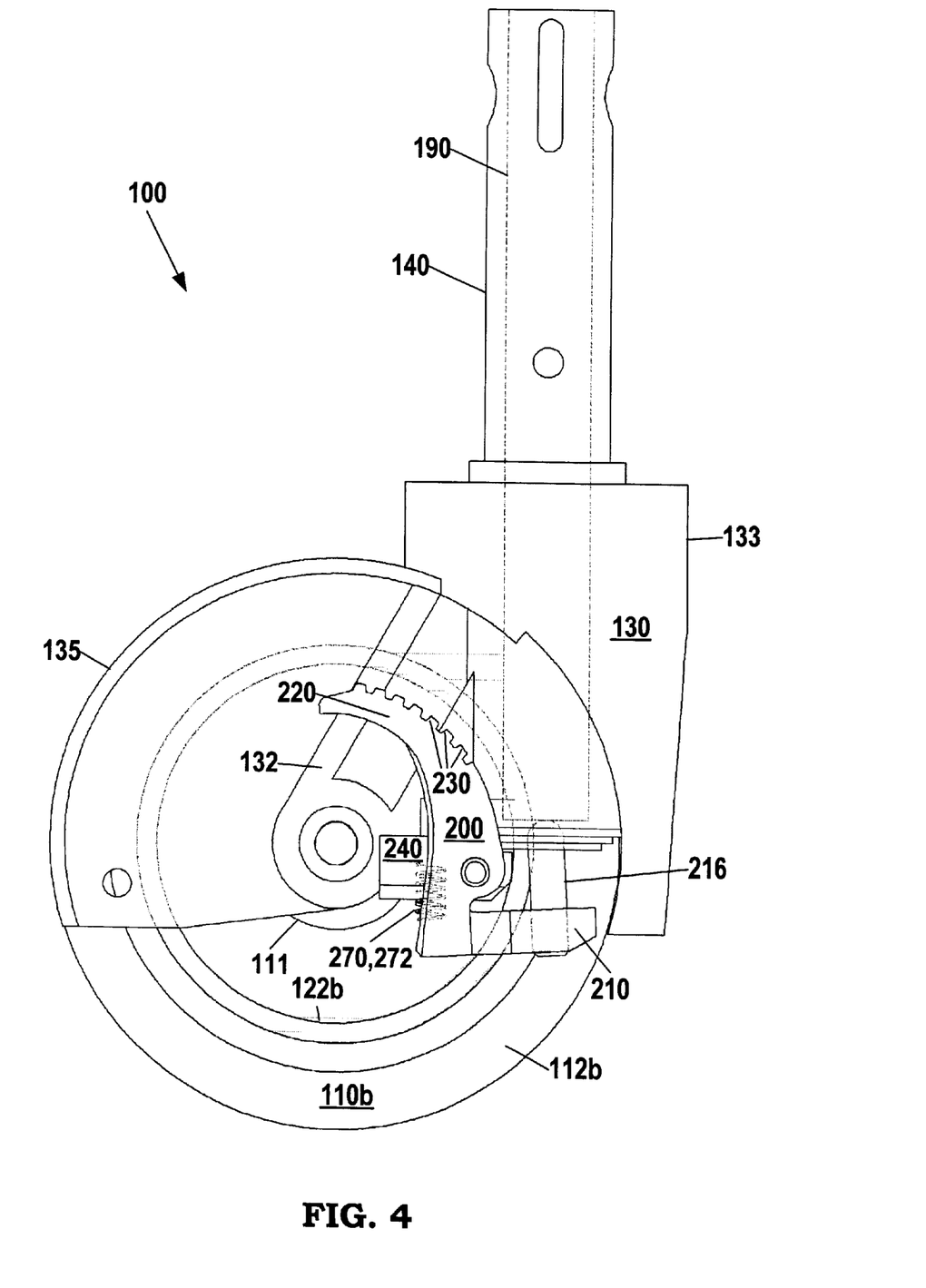
FIG. 4 shows a vertical cross-section of a roller in the form of a caster, with the brake lever in an unlocked position.
Figure 5:
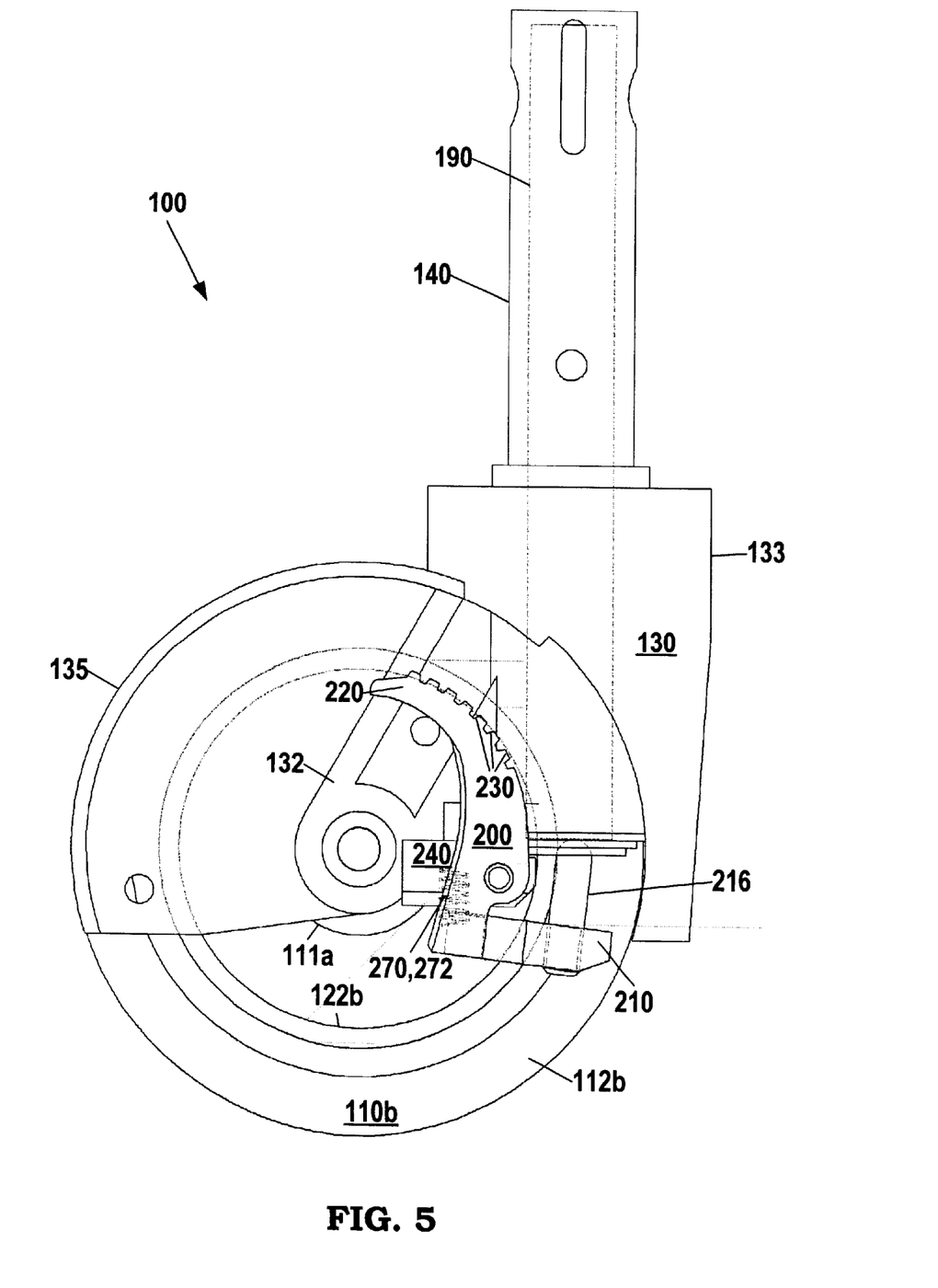
FIG. 5 shows a vertical cross-section of the roller of FIG. 4, but with the brake lever in the locked position.

A cylindrical socket 140 extends vertically from the top of the yoke 130 for receipt of a vertical pin or mount (not shown) for vertical attachment to the leg of a hospital bed such as a bariatric bed, a regular bed, a chair, or a piece of furniture or equipment (not shown). The cylindrical socket 140 houses a cam-operated plunger or push rod 190 (illustrated with broken lines in FIGS. 4 and 5). The push rod 190 engages a central locking or central braking mechanism, described in more detail below. To access the cam with a hex wrench or brake pedal, a hex wrench opening 142 is provided (FIGS. 1–3, 6). The wheels 110a, 110b of the caster 100 can be locked or unlocked by operating the cam between two or more positions. In an alternative embodiment, the push rod also engages the swivel mechanism of the caster 100 to enable a person to lock the wheel into a fixed orientation about the caster's vertical axis. In this alternative embodiment, the wheels 110a, 110b and the swivel mechanism can be simultaneously locked and unlocked, or the swivel mechanism locked independently of the wheels 110a, 110b, by operating the cam between three positions.

Figure 6:
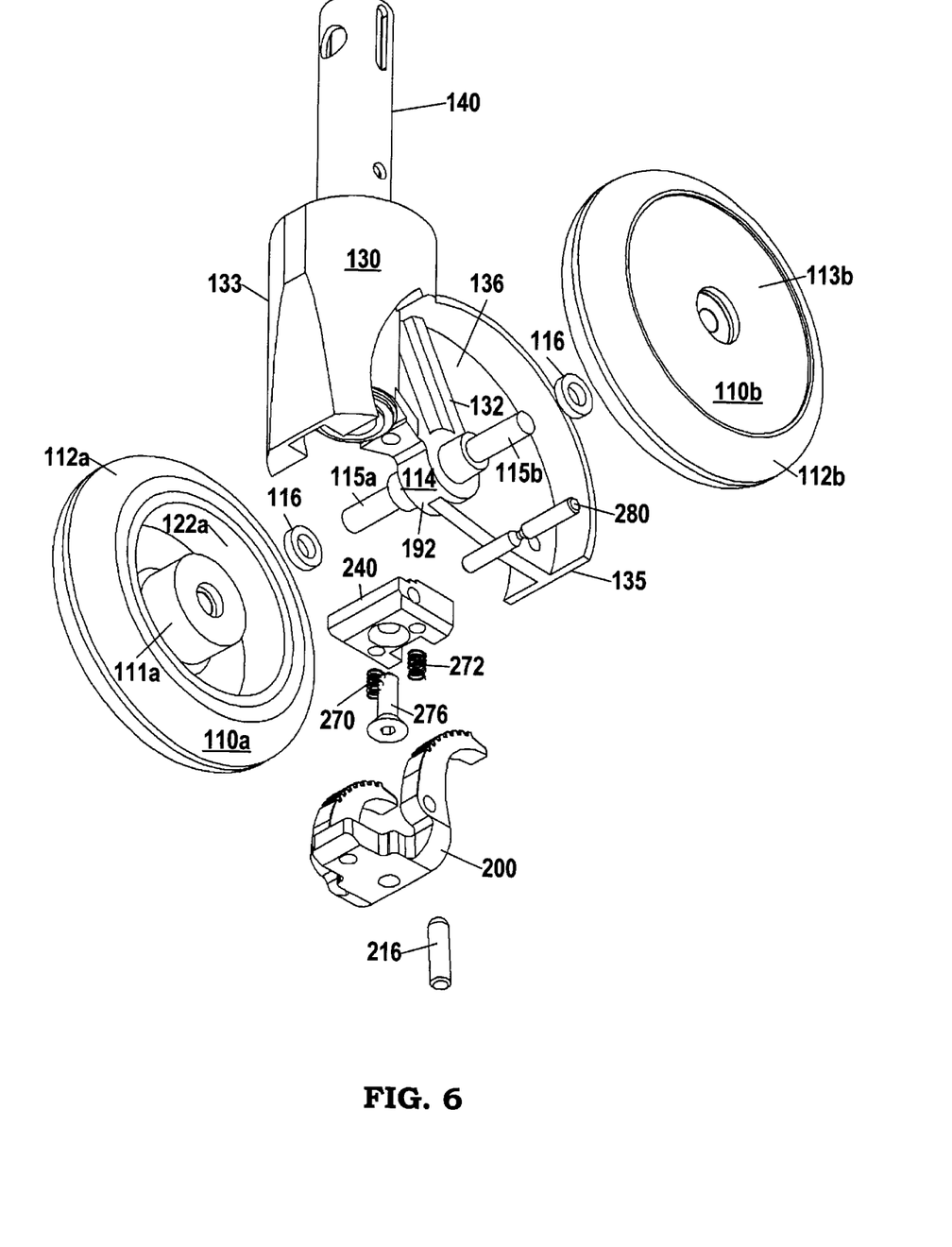
FIG. 6 is an exploded perspective view of the roller of FIG. 1, showing the relationship between the roller, the double armed brake lever, the pivot block, the flat headed socket screw that mounts the pivot block to the roller, and the bias springs that bias the arms of the brake lever away from the brake drum of the wheel.

The two wheels 110a, 110b of the caster 100 are mounted on terminal spindles 115a, 115b protruding from opposite sides of the reinforced central boss portion 192 of the axle 114 (FIG. 6). Each wheel 110a, 110b is preferably comprised of an aluminum-core disc 113a, 113b having an annular outer cylindrical flange 112a, 112b covered with elastomeric material. An elastomer-covered inside (concave) surface 122a, 122b of the annular flange 112a, 112b serves as a brake drum for the wheel 110a, 110b. The preferred composition of the elastomeric material is a proprietary blend of elastomers from Darcor° which it markets as part of its "LE" wheel, where "LE" stands for "low effort." Darcor®, which is based in Toronto, Ontario, Canada, and which operates a website at http)://www.darcor.com, describes its blend of elastomers as a long-life alternative to industrial rubber that delivers a smooth ride and is highly resistant to chemicals and extremely resistant to abrasion.

The wheels 110a, 110b further comprise hubs 111a, 111b that house bearing races to enable the wheels 110a, 110b to rotate about the spindles 115a, 115b. In this way, worn out bearing races can be simply replaced by removing and then repairing or replacing the wheels 110a, 110b. In a preferred embodiment, terminal outer portions of the spindles 115a, 115b are threaded, so that the wheels 110a, 110b can be retained on the spindles 115a, 115b with threaded retaining nuts (not shown). Replaceable spacers 116 (FIG. 6) space the hubs 111a, 111b of the wheels 110a, 110b a slight distance from the boss 192.

The central locking assembly comprises the push rod 190, a pivot block 240, a brake lever 200, and a pivot pin 280 for mounting the brake lever 200 to the pivot block 240. The central locking assembly also includes two compression springs 270, 272 disposed between the pivot block 240 and the brake lever 200. The central locking assembly also comprises a flat head socket screw 276 for mounting the pivot block 240 to the yoke 130.

Figure 7:
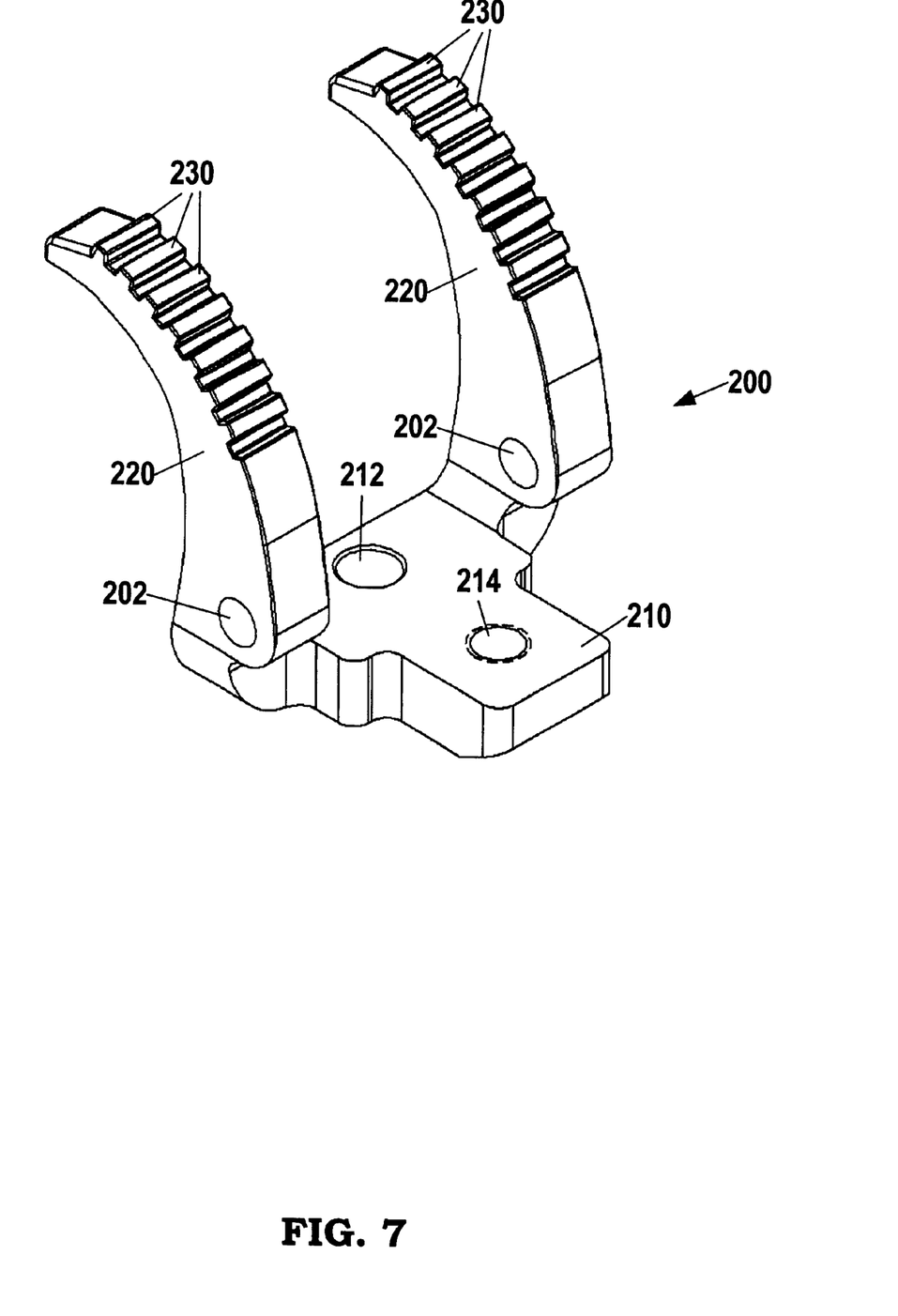
FIG. 7 is a perspective view of the double-armed brake lever, illustrating its flattened teeth.

The brake lever 200, which is vaguely reminiscent of a ram skull, comprises a saddle 210 having a substantially planar dimension and two curved brake arms 220 (preferably metallic) that extend upwardly from the saddle 210 in a direction that is initially substantially perpendicular to the planar dimension of the saddle 210. The brake arms curve away from their initial, substantially perpendicular, direction, in a direction away from the saddle 210. More particularly, the outer, engaging surfaces of the brake arms 220 are substantially semi-circular and arc across substantially parallel planes that are substantially perpendicular to the planar dimension of the saddle 210. The brake arms 220, which are connected to the saddle 210 on opposite sides of the saddle 210, also have approximately equal dimensions. Furthermore, the separation between brake arms 220 remains approximately equal throughout their curvilinear dimensions.

Several flattened teeth 230 are disposed on the convex surface of each of the brake arms 220. The flattened teeth 230 of the brake arm 220 are disposed to engage the inside elastomer-covered inside surface 122a, 122b of the annular flange 112a, 112b of the wheel 110a, 110b. Flattened teeth 230 are preferred because they do not lock up as easily on the elastomeric material. Furthermore, they are less likely to break off or cause premature damage and wear to the elastomeric material.

Pivot pin receiving holes 202 extend horizontally through the brake arms 220 proximate the region where the brake arms 220 are joined to the saddle 210. When the brake lever 200 is mounted, via a pivot pin 280, on the pivot block 240, the brake lever 200 pivots about the axis defined by the holes 202. Because this structure causes the brake lever 200 to pivot exclusively about a horizontal axis perpendicular to the direction of the wheels' forward rolling movement, the brake arm 220 is less likely to malfunction by jamming against the wheel disc 113a, 113b or the inside surface 122a, 122b of the flange 112a, 112b.

The saddle 210 of the brake lever 200 includes a pushpin mount 214 for mounting a pushpin 216. The push rod 190 engages the pushpin 216 in order to leverage the brake arm 220 about the pivot pin 280.

Figure 8:
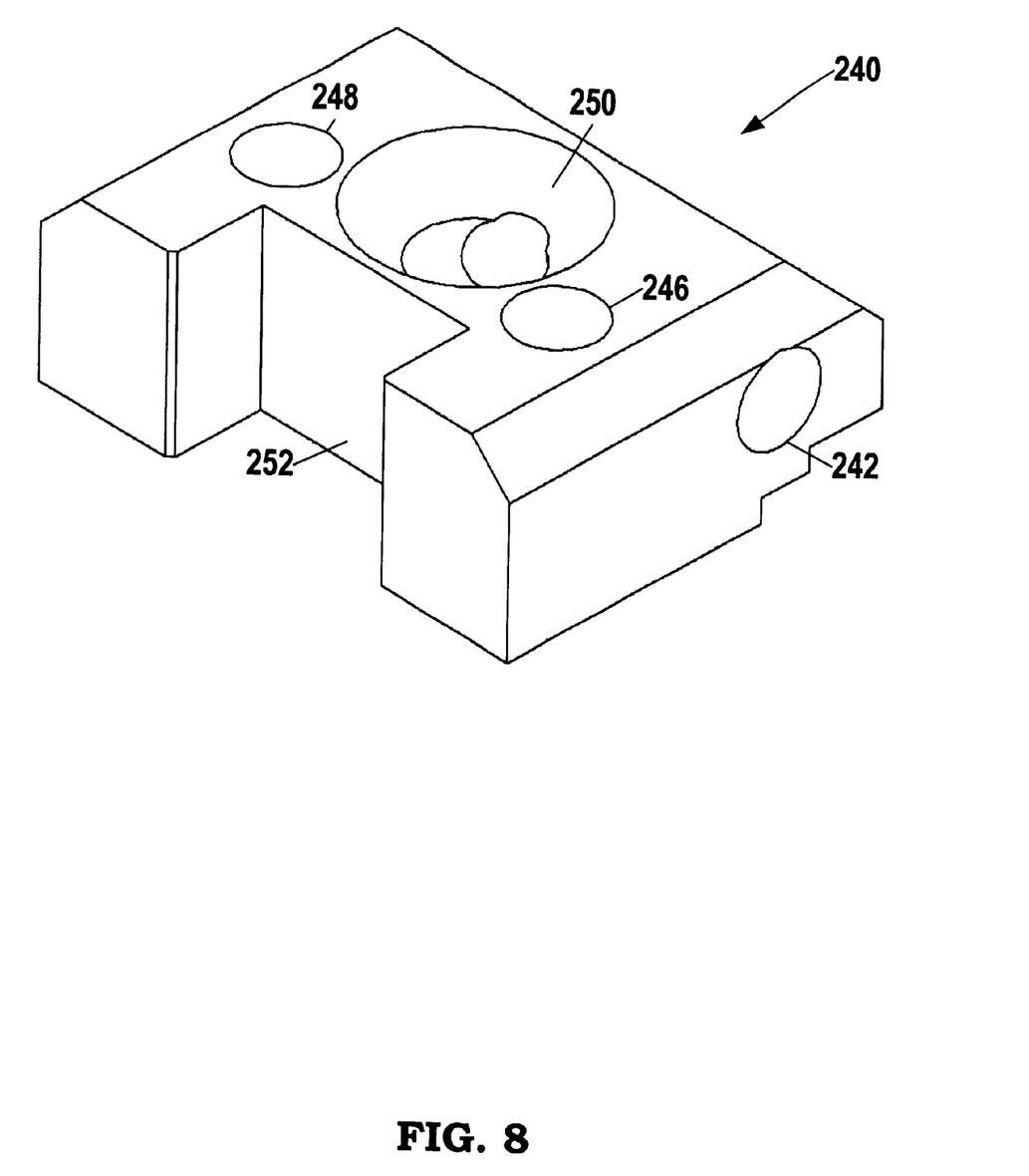
FIG. 8 is a perspective view of the pivot block.
Figure 9:
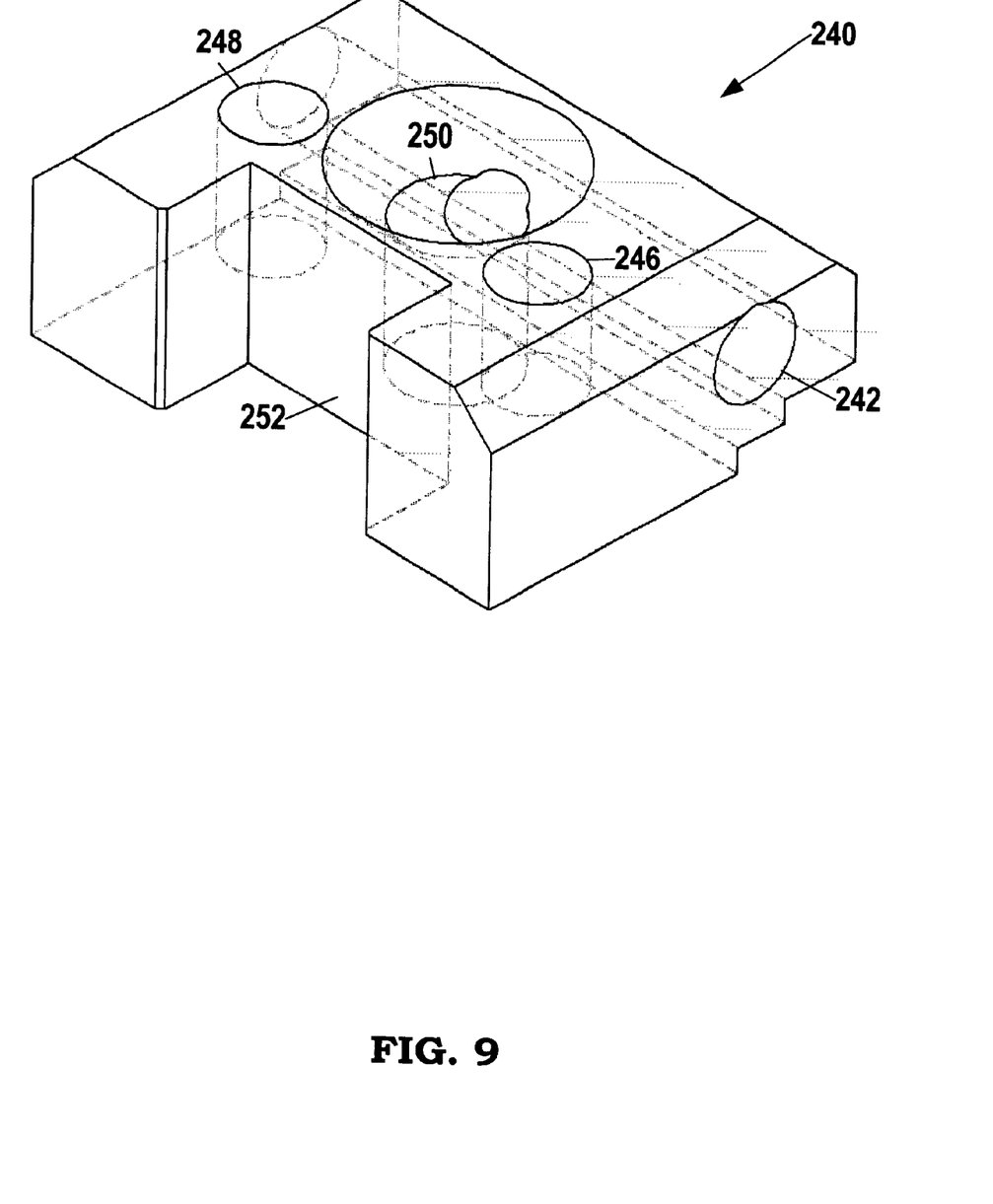
FIG. 9 is another perspective view of the pivot block, with dashed lines revealing hidden edges.

The pivot block 240 comprises a substantially rectangular solid core. An aperture 242 for receiving the pivot pin 280 extends all the way through a transverse dimension (the transverse dimension being perpendicular to the direction of the wheel's forward-rolling movement) of the pivot block 240. A centrally located aperture 250, perpendicular to and intersecting with aperture 242, extends vertically through the pivot block. The aperture is tapered at one end in order to receive a flat head hex socket screw 276. The flat head hex screw 276 is provided to mount the pivot block 240 to the yoke 130.

It will be seen that the saddle 210 of the brake lever 200 includes a hole 212 corresponding to the centrally located aperture 250. The hole 212 provides access to the socket screw 276 when the brake lever 200 is mounted on the pivot block 240. A hex wrench can be inserted through the hole 212 in order to tighten or loosen socket screw 276.

Two substantially cylindrical recesses or cavities 246, 248 disposed on opposite sides of the centrally located aperture 250 provide means for anchoring an end of each of the compression springs 270, 272. When mounted, the compression springs 270, 272 engage the saddle 210 of the brake lever 200 and bias the brake arms 220 away from the inside surfaces 122 of the annular flanges of the wheels 110a, 110b. The pivot block also comprises a recess 252 to make room for the boss 192 of the axle 114.

Figure 10:
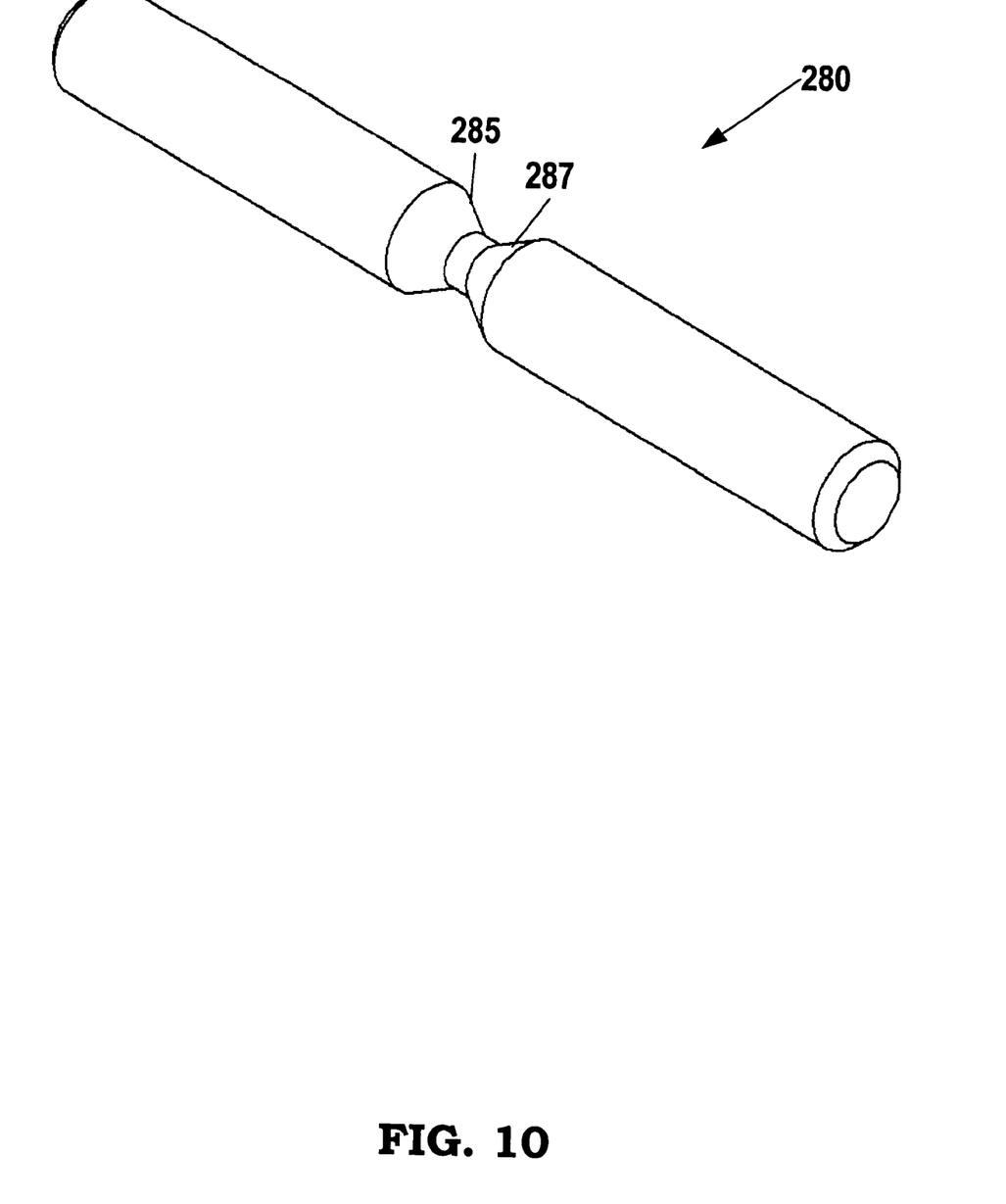
FIG. 10 is a perspective view of the pivot pin that mounts the brake lever onto the pivot block.

The pivot pin 280 itself has a substantially cylindrical shape. The diameter of the pivot pin 280 is relatively constant throughout most of the length of the pivot pin 280, except near its center, where it tapers down (as depicted by beveled surfaces 285 and 287) to a smaller diameter. When the brake mechanism is assembled, the socket screw 276 engages beveled surfaces 285 and 287 to retain the pivot pin 280 in place.

Although the foregoing specific details describe various embodiments of the invention, persons reasonably skilled in the art will recognize that various changes may be made in the details of the method and apparatus of this invention without departing from the spirit and scope of the invention as defined in the appended claims. Therefore, it should be understood that, unless otherwise specified, this invention is not to be limited to the specific details shown and described herein.

We claim:

1. A central braking caster comprising:
   a connecting apparatus;
   a wheel mounted on the connecting apparatus, the wheel having a rotational axis, the wheel also having a cylindrical flange with the inner surface thereof accessible as a brake drum;
   a pivot pin mounted on the connecting apparatus and oriented in a direction paralel to the rotational axis of the wheel;
   a brake lever mounted on the pivot pin, whereby the brake lever is disposed to pivot exclusively about a horizontal axis parallel to the rotational axis of the wheel;
   the brake lever having a brake arm, the brake arm having a convexly curved portion disposed to directly engage the brake drum of the wheel; and
   one or more compression springs each having a first end and a second end, the first end of each compression spring being seated on the connecting apparatus in fixed relation to the rotational axis of the wheel, the second end of each compression spring pressing against a portion of the brake lever to bias the brake arm away from the brake drum.

2. The central braking caster of claim 1, further comprising elastomeric material that covers the inner surface of the brake drum.

3. The ceral braking caster of claim 2, further comprising a plurality of flattened teeth disposed on the convexly curved portion of the brake arm, the teeth being disposed, when the brake arm is engaged with the brake drum, to grab the elastomeric material on the brake drum in order to inhibit wheel rotation.

4. The central braking caster of claim 1, further comprising a plurality of flattened teeth disposed on the convexly curved portion of the brake arm.

5. The central braking caster of claim 1, further comprising a cylindrical socket mounted to the connecting apparatus and housing a plunger operable to transfer force to the brake lever in order to urge the brake arm of the lever toward the brake drum.

6. The central braking caster of claim 5, further comprising a pushpin mounted on one end to the brake lever, the other end of the pushpin being positioned in operational contact with the plunger.

7. The central braking caster of claim 6, wherein the brake lever comprises a plate portion having a top face and a bottom face opposite the top face, the one or more compression springs pressing against the top face of the plate portion, the pushpin also being mounted on the top face of the plate portion, and the plunger being operable to push against the pushpin to force the brake arm to engage the brake drum.

8. The central braking caster of claim 1, wherein the brake lever comprises a pivot pin hole disposed in the brake arm of the brake lever.

9. The central braking caster of claim 1, comprising a second wheel mounted on the connecting apparatus.

10. A twin-wheeled central locking caster comprising:
    a yoke;
    first and second wheels having a rotational axis mounted on the yoke, each wheel having a cylindrical flange with the inner surface thereof accessible as a brake drum;
    a pivot pin mounted to the yoke and oriented in a direction parallel to the rotational axis of the wheels;
    a brake lever mounted on the pivot pin, whereby the brake lever is disposed to pivot exclusively about a horizontal axis parallel to the rotational axis of the wheels;
    the brake lever having first and second brake arms, the first brake arm having a convexly curved portion disposed to directly engage the brake drum of the first wheel, the second brake arm having a convexly curved portion disposed to directly engage the brake drum of the second wheel; and
    one or more compression spflngs each having a first end and a second end, the first end of each compression spring being seated in fixed relation to the yoke, the second end of each compression spring pressing against a portion of the brake lever to bias the brake arm away from the brake drum.

11. The central locking caster of claim 10, further comprising a pivot block mounted on the yoke, the pivot block having an aperture to receive the pivot pin, the pivot pin being mounted on the pivot block.

12. The central locking caster of claim 11, wherein the pivot block further comprises, for each compression spring, a recess to serve as a seat for the first end of the compression spring.

13. The central braking caster of claim 11, the pivot block furthier comprising a mounting aperture extending through the pivot block in a direction perpendicular to and intersecting with the aperture for the pivot pin, the mounting aperture being shaped to receive a flafthead screw to mount to the pivot block to the yoke.

14. The central braking caster of claim 10, wherein the brake drum of the first wheel faces the brake drum of the second wheel.

15. The central braking caster of claim 10, a plurality of flattened teeth disposed on the convexly curved portions of each of the brake arms.

16. The central braking caster of claim 10, further comprising a cylindrical socket extending vertically from the top of the yoke, the cylindrical socket housing a plunger openable to transfer force to the brake lever in order to urge the brake arms of the lever toward the brake drums of the wheels.

17. The central braking caster of claim 16, further comprising a pushpin mounted on one end to the brake lever, the other end of the pushpin being positioned in operational contact with the plunger.

18. A bed mounted on a plurality of central locking casters, each central locking caster comprising:

a yoke;

first and second wheels having a rotational axis mounted on the yoke, each wheel having a cylindrical flange with the inner surface thereof accessible as a brake drum;

a pivot pin mounted to the yoke and oriented in a direction parallel to the rotational axis of the wheels;

a brake lever mounted on the pivot pin, whereby the brake lever is disposed to pivot exclusively about a horizontal axis parallel to the rotational axis of the wheels;

the brake lever having first and second brake arms, the first brake arm having a convexly curved portion disposed to directly engage the brake drum of the first wheel, the second brake arm having a convexly curved portion disposed to directly engage the brake drum of the second wheel; and one or more compression springs each having a first end and a second end, the first end of each compression spring being seated in fixed relation to the yoke, the second end of each compression spring pressing against a portion of the brake lever to bias the brake arm away from the brake drum.

19. The bed of claim 18, each central locking caster further comprising a pivot block mounted on the yoke, the pivot block having an aperture to receive the pivot pin, the pivot pin being mounted on the pivot block.

20. The bed of claim 18, wherein the bed is a bariatric bed.

21. The bed of claim 18, a plurality of flattened teeth disposed on the convexly curved portions of each of the brake arms.

* * * * *